March 4, 1958     M. A. COLER     2,825,748
CONTAINERS AND RELATED DEVICES

Original Filed Nov. 15, 1951

*INVENTOR.*
MYRON A. COLER
BY Leonard H. King
AGENT

United States Patent Office 2,825,748
Patented Mar. 4, 1958

2,825,748

CONTAINERS AND RELATED DEVICES

Myron A. Coler, New York, N. Y.

Original application November 15, 1951, Serial No. 256,518. Divided and this application July 19, 1954, Serial No. 444,035

7 Claims. (Cl. 136—83)

This invention relates to electrochemical battery cells and in particular to containers for same.

This application is a continuation of my copending application entitled "Containers and Related Devices," filed November 15, 1951, and assigned Serial Number 256,518.

A problem which has long plagued designers of electrical equipment and of packages for the same has been the one of finding methods for effecting electrical contact through walls of insulating plastic material. This is a particular case of the still more general problem of securing a tight casing through which electrical contact may be made to material or equipment inside said casing.

Attempts to fabricate tight casings for electrical equipment generally break down into instances where the casing is predominantly metallic or predominantly insulator.

In the former case it is usually necessary to introduce more than one electrical connection to the interior of the casing. Usually at least one such connection must be insulated from the main casing body. The presence of the insulator invariably introduces problems associated with differences between the physical properties, especially the thermal expansion, of insulator and metal.

In some cases rubber insulated wire is passed through holes in the metal casing after which an attempt is made to tighten the seal by means of various kinds of clamps or packing glands. Such glands involve screwed or split parts which are seldom completely tight. The point of clamping the wire is a site for wear and fatigue. Flexible insulation and packing materials are subject to fairly rapid deterioration.

In another attempted solution of the problem, the parts of a metal casing are themselves used to carry electrical energy to or from the interior of the casing. This necessarily implies that certain parts of the casing are insulated from one another. Thus, for instance, two halves of a metal casing for an electrochemical cell system may be shaped from sheet metal and the edges of the two halves crimped together over an insulating gasket. Such seals are found in practice to be subject to rather frequent failure.

In general, the longer the line of contact between metal and insulator material, the greater the difficulty in obtaining a tight seal. Thus, the common method of sealing a Leclanche cell by casting an insulating wax into the top of a zinc case is particularly subject to leakage under the stress of changing temperature.

The attempt to seal a structure which is made predominantly of insulator material with metal contacts likewise meets with practical difficulties.

The passage of metal contacts, such as wires, through a plastic body meets with the same difficulties due to differences in thermal expansion as exist in the converse arrangement.

There is disclosed herein a simple, effective and economical means for securing electrical connection across a tight casing wall by creating an integral bond between an electrically conductive composition plastic material and an insulator plastic thus avoiding the many cited drawbacks of the prior art.

It is therefore an object of this invention to provide liquid tight battery casings through which electrical connection can be made.

It is a specific object of this invention to provide all-plastic liquid tight battery cell casings.

It is a more specific object of this invention to provide all-plastic liquid tight battery cell casings, portions of which serve as electrodes of the electrochemical cell system.

Other general and specific objects of this invention will become apparent upon perusal of the appended specifications.

For a mor complete understanding of my invention, reference should now be made to the accompanying description taken in conjunction with the drawings in which.

Figure 1:
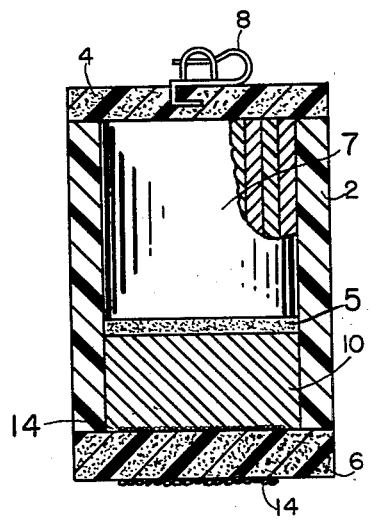
Figure 1 is a cross-sectional view in elevation of a battery of this invention.

As is well known, there exist numerous electrically conductive plastic compositions which are made by blending finely divided electrically conductive materials such as graphite and metals with insulator plastics. I have found that these materials correspond closely in their physical properties (aside from appearance and electrical conductivity) with the parent insulator plastics from which they are made. Of course, if the loading with conductive filler is very high, the strength and certain other properties of the plastic will be materially affected just as they will be by the inclusion of more common fillers.

In any case, I have found that the conductive plastic compositions can be securely bonded by various methods detailed below to the corresponding insulator plastic from which they were made. Such bonds, being between materials possessing very similar coefficients of thermal expansion, are not subject to great stress when passed through cycles of changing temperature.

Electrically conductive plastics made according to the copending application of Myron A. Coler entitled "Metallized Plastics," Serial Number 735,553, filed March 18, 1947, now abandoned, are particularly suited to the purposes of the present invention because they possess much higher conductivity for a given content of conductive material than other known electrically conductive plastic compositions. Consequently, their general physical properties depart less from those of their parent plastics than do the properties of other conductive plastic compositions possessing the same degress of electrical conductivity.

Furthermore, be it noted that, by the use of techniques described in the copending application of Myron A. Coler and Arnold S. Louis entitled "Composite Plastic Articles and Method of Making Same," Serial Number 256,519, filed November 15, 1951, the all-plastic seals of this invention need not necessarily be made between a conductive plastic composition and the insulator plastic from which it was made. It can, indeed, involve a joint between substances which are chemically quite different. Of course, the two plastic materials, conductor and insulator, should be chosen so as to have similar thermal coefficients of expansion or else undue strains may be set up in the joint during service. The required degree of similarity will be determined by the conditions of temperature cycling to which the joint will be exposed. In any particular case the determination of a reasonable correspondence of thermal coefficients of expansion will call for the use of ordinary engineering judgement. In this connection it is well to note that if one of the plastics is relatively yielding or is comparatively thin, a large difference in coefficient of expansion can be tolerated.

Aside from the use of the special technique (described in my latter named copending application of Myron A. Coler and Arnold S. Louis) for bonding together chemically dissimilar plastics, any of several methods may be used to secure a bond between an electrically conductive plastic composition and its corresponding parent insulator plastic or one chemically similar to it.

For instance, the two molding powders may be compression molded together by laying down the two powders one above the other or side by side in the mold. I speak of this process as "co-molding."

Again, one plastic may be molded by any convenient technique against an insert of the other.

Already molded pieces of the two plastics may be effectually joined by wetting the faces to be joined with a solvent, pressing the two faces together and keeping them under pressure until the solvent dries out sufficiently to make a firm bond.

In another process, molded pieces of thermoplastic type may be joined by heat sealing. Heat may be applied by contact with a heated tool or by any convenient method of generating localized heat. Particularly useful is the high frequency induction heating technique. By this means heat may be generated directly in the conductive plastic or it may be more strictly localized to the joint area by locating there a small piece of metal or by coating the surface of the plastic with metal by any of several known techniques.

In Figure 1 there is shown a tubular body of insulator plastic 2 integrally bonded to caps 4 and 6 consisting of electroconductive plastic composition 4. The caps complete the electrical circuit between an external circuit and the electrochemical system within the case formed by the tubular body 2 and the caps 4 and 6. A standard metal terminal 8 may be insert molded into electroconductive cap 4 to provide a means to connect the cap 4 to external circuits. For purposes of illustration a metallic coating to which a lead may be soldered or to which pressure contact may be made, is shown as the terminal 14. In most applications it is desired that the coating be inert electrochemically to the constituents of the battery system. Metallic coating 4 is applied to a surface of conductive plastic 6 by any of several well known techniques such as sprayed metal, electroplating, thermal evaporation or by application of a conductive lacquer. To this coating electrical contact may be made, for instance, by pressure contact or by soldering.

Figure 2:
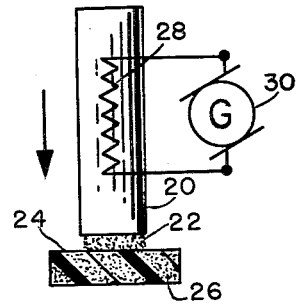
Figure 2 shows a preferred method of forming a highly conductive terminal.

A preferred coating method is disclosed in Figure 2 wherein a heated piston 20 presses finely divided metal powder 22 into the surface 24 of conductive plastic 26. Heater element 28 is energized by a source of electrical energy such as generator 30. It is preferred that a thermoplastic plastic base be employed. The piston should be heated to a temperature sufficient to soften the surface of the plastic. The pressure is not critical; a pressure of 2000 pounds per square inch being satisfactory.

Obviously the various methods of obtaining electrical contact which have been described and others which will occur to those skilled in the art may be used in any convenient combination.

I have found that a piece of electrically conductive plastic composition when used as an electrode in contact with an electrolyte will develop a potential of a similar order to that of an electrode of the pure conductive material which was used in the plastic composition. Accordingly, the electrode substances of an electrochemical system can be mixed in finely divided form with a suitable insulator plastic to form an electrically conductive plastic composition which composition can be used to make structural elements of this invention which, at the same time, serve as electrodes of an electrochemical system. Alternatively, a conductive plastic may be chosen which is inert to the electrochemical system and then the plastic may be coated with the anode or cathode material of the electrochemical system. The types of casing just described can be used to enclose any electrochemical system provided the insulator and conductive plastics are chemically resistant to its components. Cell case structures of the second type just described are particularly advantageous for the construction of very compact cells for applications requiring long life at low current drains or short life at high current drains.

Referring again to Figure 1, cylinder 2 of insulator plastic is closed at either end with discs 4 and 6 of conductive plastic. When discs 4 and 6 are made from a conductive plastic composition containing a properly selected, comparatively inert metal, the casing may be used to contain practically any electrochemical cell system.

Closure may be made by heat or solvent seal. It will be observed that closure must be completed after the cell components, including electrolyte, have been inserted. Furthermore, contact will generally be made to the inside of the conductive casing ends by means of simple pressure against the cell components.

Under these circumstances, induction heating is preferred to effect at least the final seal because by this means heat may be generated quickly and locally at the bonding region without overheating the cell electrolyte or the other inner components of the cell. This is shown pictorially in Figure 3 where a two-turn coil of copper tubing 40 is fitted closely around the region of the final bond 42. The tubing is connected to a source of radio frequency electrical energy. The speed and localization of this energy release can be increased if cap 43 is coated with metal 45.

Figure 3:
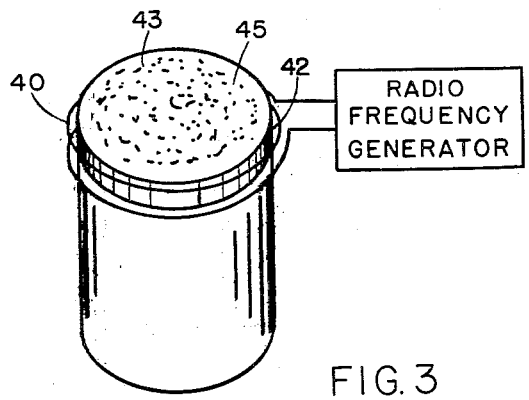
Figure 3 shows in perspective an embodiment of this invention in the form of a sealed container and a preferred method of sealing same.

Specifically, I have made cells of the zinc-potassium-hydroxide-mercuric oxide type commonly known as Ruben-Mallory cells as follows: Cylinder 2 (Figure 1) was a tube of polystyrene 0.46 inch high, 0.63 inch in outside diameter and 0.50 inch in inside diameter. To this was firmly bonded a disc 6, 0.08 inch thick, made of an electrically conductive plastic composition containing about 10% silver and 90% polystyrene. In the cup thus formed were placed a mercuric oxide depolarizer pellet 10, barrier disc 5, anode assembly 7 and electrolyte identical with those employed in commercial cells of similar type. The dimensions of the cylinder had been chosen so that these parts would be subjected to mechanical compression during the next step of cell assembly. A second disc 4, similar to the first, was then pressed on top of the cup and its contents and the whole positioned inside a close fitting two-turn copper coil 40 as shown in Figure 3 connected to a generator of high frequency electric current, so that the coil closely surrounded the junction between cup and disc. The current was turned on for 10 seonds during which time 260 milliamperes at 115 volts were drawn from the plate circuit of the source. The assembly was cooled under pressure.

Many cells assembled in the above described fashion have been tested and found to have operating characterisics fully equal to preexisting commercial cells and at the same time free of gross electrolyte leaking which is a serious problem with metal encased cells when they are stored for long periods of time.

Likewise, I have found that similar structures in which the insulator plastic is polymonochlorotrifluoroethylene are well suited for encasing highly corrosive electrochemical systems such as those containing hydrofluoric acid.

When a compact cell possessing long life at low current drain is desired, the height of the cylinder 2 can be reduced greatly. Discs 4 and 6 can be made from an electrically conductive plastic composition prepared by incorporating in a suitable insulator plastic the appropriate electrode materials for the electrochemical cell system in question. The interior of the cell is filled with electrolyte and depolarizer.

Figure 4:
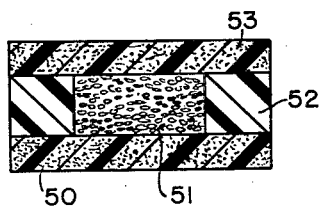
Figure 4 is a cross-sectional view in elevation of another battery of this invention.

A cell of this type is shown in Figure 4 wherein a disc 50 was formed from a thin wafer of a conductive plastic composition containing about 92% polymonochlorotrifluoroethylene and 8% acetylene black. On this layer a wafer 51 of porous polymonochlorotrifluoroethylene impregnated with a slurry of finely divided manganese dioxide in a solution containing about 20% ammonium chloride was placed. Around this was placed a ring shaped wafer 52 of polymonochlorotrifluoroethylene. On top was placed a wafer 53 of a conductive plastic composition containing about 90% polymonochlorotrifluoroethylene and 10% finely divided zinc metal. The cell was sealed together by induction heating. The assembled cell was liquid-tight, showed good storage properties and developed a potential of 1.3 volts.

Figure 5:
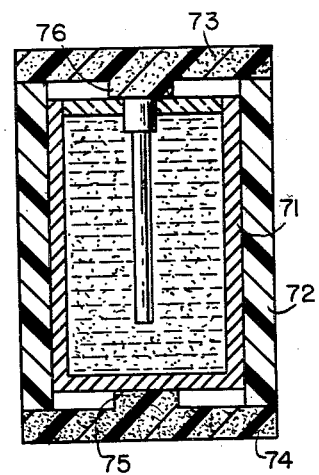
Figure 5 is a cross-sectional view of a standard zinc-carbon dry cell in a casing of this invention.

The encasement of a standard zinc-carbon cell 71 in a sealed plastic case of this invention is shown in Figure 5 wherein an insulating plastic tube 72 encircles the battery 71 and conductive plastic caps 73, 74 complete the unit. The caps are provided with contact making surfaces 75 and 76. It is preferred that a metallic coating be applied to surfaces 75 and 76 as discussed earlier.

The many embodiments of the invention disclosed herein are intended to be descriptive of what I currently believe to be the preferred version and are not intended to be limiting in any sense for it is appreciated that those skilled in the art may make many changes and adaptations without departing from the spirit of the invention and it is therefore my intent that the appended claims cover all such changes and adaptations as fall within the spirit and scope of the present invention.

I claim:

1. A dry cell consisting of an electrochemical system enclosed in a tubular insulator organic plastic member having sealed to each end a conductive plastic cap, said electrochemical system having a cathode member in electrical contact with one of said conductive organic plastic caps and an anode member in electrical contact with the other of said conductive organic plastic caps, the conductive organic plastic being chemically and electrochemically non-reactive to said electrochemical system.

2. The dry cell of claim 1 wherein said cathode member is adherently deposited on the enclosed face of one of said caps and said anode member is deposited on the enclosed face of the other of said caps.

3. A dry cell of claim 1 having deposited on the exposed faces of said conductive plastic caps a contact making surface of a highly conductive material, said material being chemically and electrochemically non-reactive with the components of said electrochemical system.

4. A dry cell having an anode portion consisting of a conductive organic plastic material containing an anodic material and a cathode portion spaced therefrom consisting of a conductive organic plastic material containing a cathodic material, an electrolyte disposed between said anode and said cathode, and an insulating organic plastic portion enclosing said electrolyte interposed between said anode and said cathode portions and sealed thereto.

5. The dry cell of claim 1 wherein said conductive plastic is formed of a body of organic molding plastic having a fine lacy network of solid conductive material extending therethrough providing a multiplicity of conductive paths through said body.

6. The dry cell of claim 1 wherein said conductive plastic is formed of a body of organic molding plastic having a fine lacy network of solid conductive material extending therethrough providing a multiplicity of conductive paths through said body and the exposed faces of said conductive plastic caps have deposited on their exposed faces a highly conductive contact making surface.

7. The dry cell of claim 4 wherein said conductive plastic is formed of a body of organic molding plastic having a fine lacy network of solid conductive material extending therethrough providing a multiplicity of conductive paths through said body.

References Cited in the file of this patent

UNITED STATES PATENTS

| | | |
|---|---|---|
| 2,572,017 | Ellis | Oct. 23, 1951 |
| 2,684,397 | Gottschall | July 20, 1954 |
| 2,686,214 | Arbogast | Aug. 10, 1954 |